US008352469B2

(12) United States Patent
Rose (10) Patent No.: US 8,352,469 B2
(45) Date of Patent: *Jan. 8, 2013

(54) AUTOMATIC GENERATION OF STOP WORD LISTS FOR INFORMATION RETRIEVAL AND ANALYSIS

(75) Inventor: Stuart J Rose, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 460 days.

This patent is subject to a terminal disclaimer.

(21) Appl. No.: 12/555,962

(22) Filed: Sep. 9, 2009

(65) Prior Publication Data

US 2011/0004610 A1 Jan. 6, 2011

Related U.S. Application Data

(60) Provisional application No. 61/222,737, filed on Jul. 2, 2009.

(51) Int. Cl.
*G06F 7/00* (2006.01)
*G06F 17/30* (2006.01)

(52) U.S. Cl. .......... 707/736; 707/737; 707/749; 706/45; 706/46; 706/47

(58) Field of Classification Search .................. None
See application file for complete search history.

(56) References Cited

U.S. PATENT DOCUMENTS

| | | | | | |
|---|---|---|---|---|---|
| 6,128,613 | A * | 10/2000 | Wong et al. | ................... | 707/738 |
| 6,189,002 | B1 * | 2/2001 | Roitblat | ................................ | 1/1 |
| 6,470,307 | B1 * | 10/2002 | Turney | ............................... | 704/9 |
| 6,886,010 | B2 * | 4/2005 | Kostoff | ................................ | 1/1 |
| 7,275,061 | B1 * | 9/2007 | Kon et al. | ............................... | 1/1 |
| 7,505,969 | B2 * | 3/2009 | Musgrove et al. | ................... | 1/1 |
| 7,627,559 | B2 * | 12/2009 | Srivastava et al. | ..................... | 1/1 |
| 7,860,706 | B2 * | 12/2010 | Abir | ................................ | 704/4 |
| 2004/0139058 | A1 * | 7/2004 | Gosby et al. | ...................... | 707/3 |
| 2006/0026152 | A1 | 2/2006 | Zeng et al. | | |
| 2007/0061320 | A1 * | 3/2007 | Surendran | ......................... | 707/5 |
| 2009/0094021 | A1 * | 4/2009 | Marvit et al. | ...................... | 704/9 |

OTHER PUBLICATIONS

Fox, Christopher; A Stop List for General Text, ACM SIGIR Forum, 1989, 19-35 pp., vol. 24, Issue 1-2, ACM, New York, NY, USA.
A. Bernardini, et al., "Full-Subtopic Retrieval with Keyphrase-based Search Results Clustering," IEEE/WIC/ACM International Conference on Web Intelligence and Intelligent Agent Technology, Sep. 16, 2009, 206-213 pp., Rome, Italy.
N. Kumar, et al., "Automatic Keyphrase Extraction from Scientific Documents Using N-gram Filtration Technique," ACM Symposium on Document Engineering, Sep. 16, 2008, 199-208 pp., Sao Paulo, Brazil.

(Continued)

*Primary Examiner* — Angelica Ruiz
(74) *Attorney, Agent, or Firm* — Allan C. Tuan (57) ABSTRACT

Methods and systems for automatically generating lists of stop words for information retrieval and analysis. Generation of the stop words can include providing a corpus of documents and a plurality of keywords. From the corpus of documents, a term list of all terms is constructed and both a keyword adjacency frequency and a keyword frequency are determined. If a ratio of the keyword adjacency frequency to the keyword frequency for a particular term on the term list is less than a predetermined value, then that term is excluded from the term list. The resulting term list is truncated based on predetermined criteria to form a stop word list.

12 Claims, 7 Drawing Sheets

| word | term frequency | document frequency | adjacency frequency | keyword frequency |
|---|---|---|---|---|
| the | 8611 | 978 | 3492 | 3 |
| of | 5546 | 939 | 1546 | 68 |
| and | 3644 | 911 | 2104 | 23 |
| a | 3599 | 893 | 1451 | 2 |
| to | 3000 | 879 | 792 | 10 |
| in | 2656 | 837 | 1402 | 7 |
| is | 1974 | 757 | 1175 | 0 |
| for | 1912 | 767 | 951 | 9 |
| that | 1129 | 590 | 330 | 0 |
| with | 1065 | 577 | 535 | 3 |
| are | 1079 | 576 | 555 | 1 |
| this | 964 | 581 | 645 | 0 |
| on | 919 | 550 | 340 | 8 |
| an | 856 | 504 | 332 | 0 |
| we | 822 | 388 | 731 | 0 |
| by | 773 | 475 | 283 | 0 |
| as | 743 | 435 | 344 | 0 |
| be | 595 | 395 | 170 | 0 |
| it | 860 | 369 | 339 | 13 |
| system | 507 | 255 | 86 | 202 |
| can | 452 | 319 | 250 | 0 |
| based | 451 | 293 | 168 | 15 |
| from | 447 | 309 | 187 | 0 |
| using | 428 | 282 | 260 | 0 |
| control | 409 | 166 | 12 | 237 |
| which | 402 | 280 | 28 | 0 |
| paper | 398 | 339 | 196 | 1 |

| | | | | |
|---|---|---|---|---|
| systems | 384 | 194 | 44 | 191 |
| method | 347 | 188 | 78 | 85 |
| data | 347 | 159 | 39 | 131 |
| time | 345 | 201 | 24 | 95 |
| model | 343 | 157 | 37 | 122 |
| information | 322 | 153 | 18 | 151 |
| or | 315 | 218 | 146 | 0 |
| s | 314 | 196 | 27 | 0 |
| have | 301 | 219 | 149 | 0 |
| has | 297 | 225 | 166 | 0 |
| at | 296 | 216 | 141 | 0 |
| new | 294 | 197 | 93 | 4 |
| two | 187 | 205 | 83 | 5 |
| algorithm | 267 | 123 | 36 | 96 |
| results | 262 | 221 | 129 | 14 |
| used | 262 | 204 | 92 | 0 |
| was | 254 | 125 | 161 | 0 |
| these | 252 | 200 | 93 | 0 |
| also | 254 | 219 | 139 | 0 |
| such | 249 | 198 | 140 | 0 |
| problem | 234 | 137 | 36 | 55 |
| design | 225 | 110 | 38 | 68 |

OTHER PUBLICATIONS

I. Maslowska, "Phrase-Based Hierarchical Clustering of Web Search Results," F. Sebastianai (Ed.): ECIR 2003, 555-562 pp., Springer Verlag, Berlin, Heidelberg.

S. Raje, et al., "Extraction of Key Phrases from Document using Statistical and Linguistic analysis," Computer Science & Education, 2009. ICCSE '09. 4th International Conference on, IEEE, Jul. 25, 2009, 161-164 pp., Piscataway, NJ, USA.

P. Turney, "Learning to extract key phrases from text," NRC-CNRC National Research Council of Canada, vol. NRC/ERB-1057, Feb. 1, 1999, 1-45 pp., http://www.iit-iti.nrc.cnrc.gc.ca/iit-publications-iti/docs/NRC-41622.pd.

S. Havre, et al., "ThemeRiver: Visualizing Thematic Changes in Large Document Collections," IEEE Transactions on Visualization and Computer Graphics, IEEE Service Center, vol. 8, No. 1, Jan. 1, 2002, pp. 9-20, Los Alamitos, CA.

International Search Report/Written Opinion, International Application No. PCT/US2010/042595, International Filing Date Jul. 20, 2010, Date of Mailing Nov. 19, 2010.

* cited by examiner

*Fig. 1*

| word | term frequency | document frequency | adjacency frequency | keyword frequency |
|---|---|---|---|---|
| the | 8611 | 978 | 3492 | 3 |
| of | 5546 | 939 | 1546 | 68 |
| and | 3644 | 911 | 2104 | 23 |
| a | 3599 | 893 | 1451 | 2 |
| to | 3000 | 879 | 792 | 10 |
| in | 2656 | 837 | 1402 | 7 |
| is | 1974 | 757 | 1175 | 0 |
| for | 1912 | 767 | 951 | 9 |
| that | 1129 | 590 | 330 | 0 |
| with | 1065 | 577 | 535 | 3 |
| are | 1079 | 576 | 555 | 1 |
| this | 964 | 581 | 645 | 0 |
| on | 919 | 550 | 340 | 8 |
| an | 856 | 504 | 332 | 0 |
| we | 822 | 388 | 731 | 0 |
| by | 773 | 475 | 283 | 0 |
| as | 743 | 435 | 344 | 0 |
| be | 595 | 395 | 170 | 0 |
| it | 860 | 369 | 339 | 13 |
| system | 507 | 255 | 86 | 202 |
| can | 452 | 319 | 250 | 0 |
| based | 451 | 293 | 168 | 15 |
| from | 447 | 309 | 187 | 0 |
| using | 428 | 282 | 260 | 0 |
| control | 409 | 166 | 12 | 237 |
| which | 402 | 280 | 28 | 0 |
| paper | 398 | 339 | 196 | 1 |

*Fig. 1a*

| | | | | |
|---|---|---|---|---|
| systems | 384 | 194 | 44 | 191 |
| method | 347 | 188 | 78 | 85 |
| data | 347 | 159 | 39 | 131 |
| time | 345 | 201 | 24 | 95 |
| model | 343 | 157 | 37 | 122 |
| information | 322 | 153 | 18 | 151 |
| or | 315 | 218 | 146 | 0 |
| s | 314 | 196 | 27 | 0 |
| have | 301 | 219 | 149 | 0 |
| has | 297 | 225 | 166 | 0 |
| at | 296 | 216 | 141 | 0 |
| new | 294 | 197 | 93 | 4 |
| two | 187 | 205 | 83 | 5 |
| algorithm | 267 | 123 | 36 | 96 |
| results | 262 | 221 | 129 | 14 |
| used | 262 | 204 | 92 | 0 |
| was | 254 | 125 | 161 | 0 |
| these | 252 | 200 | 93 | 0 |
| also | 254 | 219 | 139 | 0 |
| such | 249 | 198 | 140 | 0 |
| problem | 234 | 137 | 36 | 55 |
| design | 225 | 110 | 38 | 68 |

*Fig. 1b*

Compatibility--systems--linear constraints--set--natural numbers --Criteria--compatibility--system--linear Diophantine equations-- strict inequation--nonstrict inequations--Upper bounds-- components--minimal set--solutions--algorithms--minimal geratiing sets--solutions--systems--criteria--corresponding algoeithims--constructing--minimal supporting set--solving-- systems--systems

*Fig. 2*

Compatibility of systems of linear constraints over the set of natural numbers

Criteria of compatibility of a system of linear Diophantine equations, strict inequations, and nonstrict inequations are considered. Upper bounds for components of a minimal set of solutions and algorithms of construction of minimal generating sets of solutions for all types of systems are given. These citeria and the corresponding algorithms for constructing a minimal supporting set of solutions can be used in solving all the considered types of systems and systems of mixed types.

<u>Manually assigned keywords:</u>
linear constraints, set of natural numbers, linear Diophantine equations, strict inequations, nonstrict inequations, upper bounds, minimal generating sets

*Fig. 3*

|   | algorithms | bounds | compatibility | components | constraints | constructing | corresponding | criteria | diophantine | equations | generating | inequations | linear | minimal | natural | nonstrict | numbers | set | sets | solving | strict | supporting | system | systems | upper |
|---|---|---|---|---|---|---|---|---|---|---|---|---|---|---|---|---|---|---|---|---|---|---|---|---|---|
| algorithms | 2 | | | | | | 1 | | | | | | | | | | | | | | | | | | |
| bounds | | 1 | | | | | | | | | | | | | | | | | | | | | | | 1 |
| compatibility | | | 2 | | | | | | | | | | | | | | | | | | | | | | |
| components | | | | 1 | | | | | | | | | | | | | | | | | | | | | |
| constraints | | | | | 1 | | | | | | | 1 | | | | | | | | | | | | | |
| constructing | | | | | | 1 | | | | | | | | | | | | | | | | | | | |
| corresponding | 1 | | | | | | 1 | | | | | | | | | | | | | | | | | | |
| criteria | | | | | | | | 2 | | | | | | | | | | | | | | | | | |
| diophantine | | | | | | | | | 1 | 1 | | 1 | | | | | | | | | | | | | |
| equations | | | | | | | | | 1 | 1 | | 1 | | | | | | | | | | | | | |
| generating | | | | | | | | | | 1 | | | 1 | | | 1 | | | | | | | | | |
| inequations | | | | | | | | | | | | 2 | | | | | | | 1 | | | | | | |
| linear | | | | 1 | | | | | 1 | 1 | | | 2 | | | | | | | | | | | | |
| minimal | | | | | | | | | | 1 | | | 3 | | | | | 2 | 1 | | 1 | | | | |
| natural | | | | | | | | | | | | | | 1 | 1 | | | | | | | | | | |
| nonstrict | | | | | | | | | | 1 | | | | | 1 | | | | | | | | | | |
| numbers | | | | | | | | | | | | | | | 1 | 1 | | | | | | | | | |
| set | | | | | | | | | | | | | 2 | | | | | 3 | | | | | | | |
| sets | | | | | | | | | | 1 | | | 1 | | | | | | 1 | | | | | | |
| solving | | | | | | | | | | | | | | | | | | | | 1 | | | | | |
| strict | | | | | | | | | | 1 | | | | | | | | | | | 1 | | | | |
| supporting | | | | | | | | | | | | | 1 | | | 1 | | | | | | 1 | | | |
| system | | | | | | | | | | | | | | | | | | | | | | | | 1 | |
| systems | | | | | | | | | | | | | | | | | | | | | | | | 4 | |
| upper | | 1 | | | | | | | | | | | | | | | | | | | | | | | 1 |

Fig. 4

| word | deg(w) | freq(w) | deg(w)/freq(w) |
|---|---|---|---|
| upper | 2 | 1 | 2 |
| systems | 4 | 4 | 1 |
| system | 1 | 1 | 1 |
| supporting | 3 | 1 | 3 |
| strict | 2 | 1 | 2 |
| solving | 1 | 1 | 1 |
| sets | 3 | 1 | 3 |
| set | 6 | 3 | 2 |
| numbers | 2 | 1 | 2 |
| nonstrict | 2 | 1 | 2 |
| natural | 2 | 1 | 2 |
| minimal | 8 | 3 | 2.7 |
| linear | 5 | 2 | 2.5 |
| inequations | 4 | 2 | 2 |
| generating | 3 | 1 | 3 |
| equations | 3 | 1 | 3 |
| diophantine | 3 | 1 | 3 |
| criteria | 2 | 2 | 1 |
| corresponding | 2 | 1 | 2 |
| constructing | 1 | 1 | 1 |
| constraints | 2 | 1 | 2 |
| components | 1 | 1 | 1 |
| compatibility | 2 | 2 | 1 |
| bounds | 2 | 1 | 2 |
| algorithms | 3 | 2 | 1.5 |

*Fig. 5* minimal generating sets (8.7), linear diophantine equations (8.5), minimal supporting set (7.7), minimal set (4.7), linear constraints (4.5), natural numbers (4), strict inequations(4), nonstrict inequations (4), upper bounds (4), corresponding algorithms (3.5), set (2), algorithms (1.5), compatibility (1), systems (1), criteria (1), system (1), components (1), constructing (1), solving (1)

*Fig. 6*

| Method | Stoplist Size | Extracted Keywords | | Correct Keywords | | | Precision | Recall | F-measure |
|---|---|---|---|---|---|---|---|---|---|
| | | Total | Mean | Total | Mean | | | | |
| RAKE (T=.33) | | | | | | | | | |
| TF stoplist (df > 10) | 1347 | 3,670 | 7.3 | 606 | 1.2 | | 16.5 | 12.3 | 14.1 |
| TF stoplist (df > 25) | 527 | 5,563 | 11.1 | 1,032 | 2.1 | | 18.6 | 21.0 | 19.7 |
| TF stoplist (df > 50) | 205 | 7,249 | 14.5 | 1,520 | 3.0 | | 21.0 | 30.9 | 25.0 |
| RAKE (T=.33) | | | | | | | | | |
| TF stoplist (df > 10) | 763 | 6,052 | 12.1 | 2,037 | 4.1 | | 33.7 | 41.5 | 37.2 |
| TF stoplist (df > 25) | 325 | 7,079 | 14.2 | 2,103 | 4.3 | | 29.7 | 42.8 | 35.1 |
| TF stoplist (df > 50) | 147 | 8,013 | 16.0 | 2,117 | 4.3 | | 26.4 | 43.1 | 32.8 |

Fig. 7

AUTOMATIC GENERATION OF STOP WORD LISTS FOR INFORMATION RETRIEVAL AND ANALYSIS

PRIORITY

This invention claims priority from U.S. Provisional Patent Application No. 61/222,737, entitled "Feature Extraction Methods and Apparatus for Information Retrieval and Analysis," filed Jul. 2, 2009.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Lists of stop words are used in many text analysis applications to eliminate non-content bearing words from analysis in order to improve results and accelerate processing. Elimination of stop words can have significant impact on analyses. However, formal methods associated with the automatic creation of these lists are rare. Typically, stop word lists are hand crafted to particular deployments and applications. In some cases applications enable users to modify stop lists based on their own assessments. Accordingly, a need exists for methods and apparatus for automatic generation of stop word lists.

SUMMARY

The present invention can be applied to automatically generate a list of stop words from a set of training documents for which each document has an associated list of start words. As used herein a stop word refers to non-content bearing words and/or words with minimal lexical meaning. Exemplary stop words can include, but are not limited to function words such as and, the, and of. Start words in training documents, as used herein, can refer to identified entities, content words, keywords, keyphrases and/or other content-bearing lexical units. In most instances, keywords are used as start words, so the two terms are typically used equivalently and interchangeably herein unless specified otherwise.

In one embodiment of the present invention, generation of a list of stop words involves providing a corpus of documents and a plurality of keywords. Preferably, keywords are provided for each document in the corpus. From the corpus of documents, a term list of all terms is constructed and both a keyword adjacency frequency and a keyword frequency are determined.

The keyword adjacency frequency reflects the number of times a term occurs adjacent to a keyword. The keyword frequency reflects the number of times a term occurs within one of the keywords. If a ratio of the keyword adjacency frequency to the keyword frequency for a particular term on the term list is less than a predetermined value, then that term is excluded from the term list. In a particular embodiment, the predetermined value for the ratio is one.

The resulting term list is then truncated based on predetermined criteria to form a stop word list. Exemplary predetermined criteria for truncation can include, but are not limited to, a predetermined fixed length for the stop word list or a document frequency value that is less than a threshold value. The document frequency, as used herein, can refer to a value that reflects the number of documents in which a term occurs.

In preferred embodiments, the automatically generated stop list can be applied to parse a second corpus of documents. In this sense, the first corpus of documents can be viewed as a training set. For example, training documents in the first corpus can be selected from particular information domains and/or sources in order to generate a particular stop list for that domain or source.

A system for generating stop word lists for information retrieval and analysis can include a storage device, a communications interface, or both that provide a corpus of documents and a plurality of keywords. A processor can be programmed to then construct a term list of all terms in the corpus of documents, to determine the keyword frequency and the keyword adjacency frequency of terms in the corpus of documents, to exclude terms from the term list if a ratio of the keyword adjacency frequency to the keyword frequency is less than a predetermined value, and to truncate the term list based on predetermined criteria in order to form the stop word list. In preferred embodiments of systems for generating stop word lists, the processor can be further configured to apply to stop word list to parse a second corpus of documents.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

FIG. 5 shows word scores for each of the content words in the sample abstract of FIG. 3.

FIG. 6 lists each candidate keyword and its keyword score from the sample abstract.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

The present invention can be applied in many different systems and applications. For example, an automatically generated stoplist can be used to configure other information extraction and analysis tools. According to embodiments of the present invention, the automatically generated stoplist can be created from a set of training documents for which keywords are defined.

In a particular instance, a collection of technical abstracts was used for stop list generation according to embodiments of the present invention. The collection consisted of 2000 Inspec abstracts for journal papers from Computer Science and Information Technology. Each abstract had a list of manually assigned keywords already associated therewith. The abstracts were divided into a training set with 1000 abstracts, a validation set with 500 abstracts, and a testing set with 500 abstracts. The stop list was automatically generated by first identifying for each abstract in the Inspec training set the words occurring adjacent to words in the abstract's manually assigned keyword list. The frequency of each word occurring adjacent to a keyword was accumulated across the abstracts. Words that occurred within a minimum threshold number of documents were added to the stoplist and ordered by their total term frequency.

Figure 1:
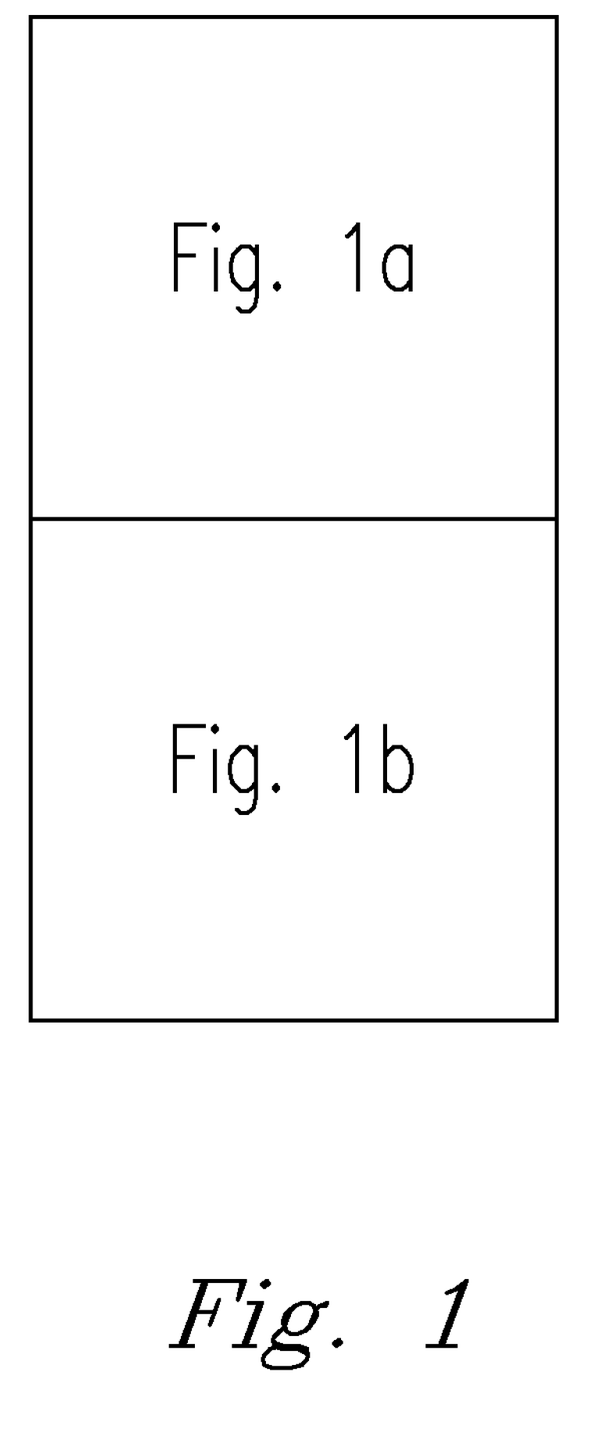
FIG. 1 includes a list of the top 50 words by term frequency in a training set for automatic stop word list generation.
Figure 1A:
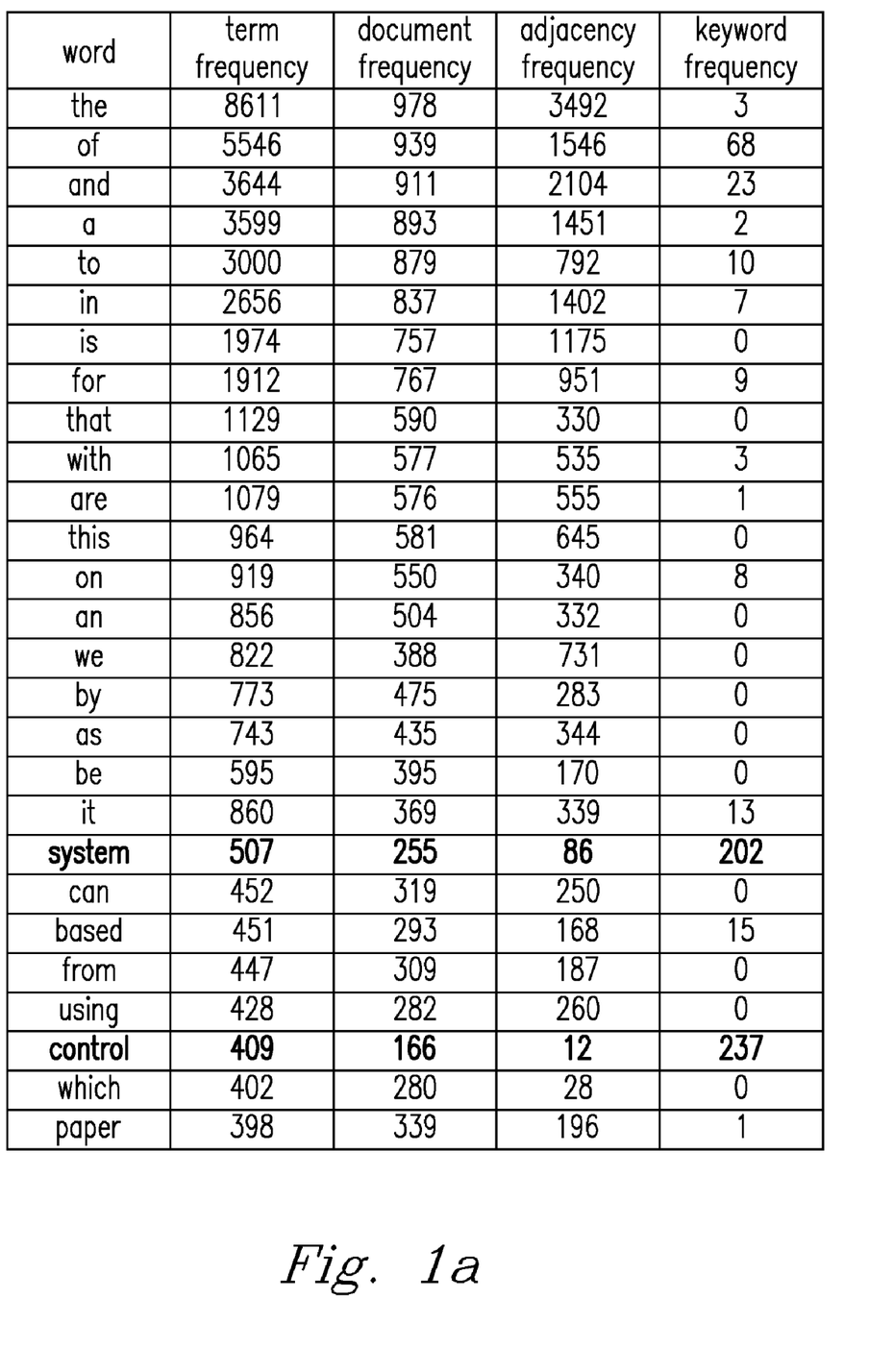
Figure 1B:
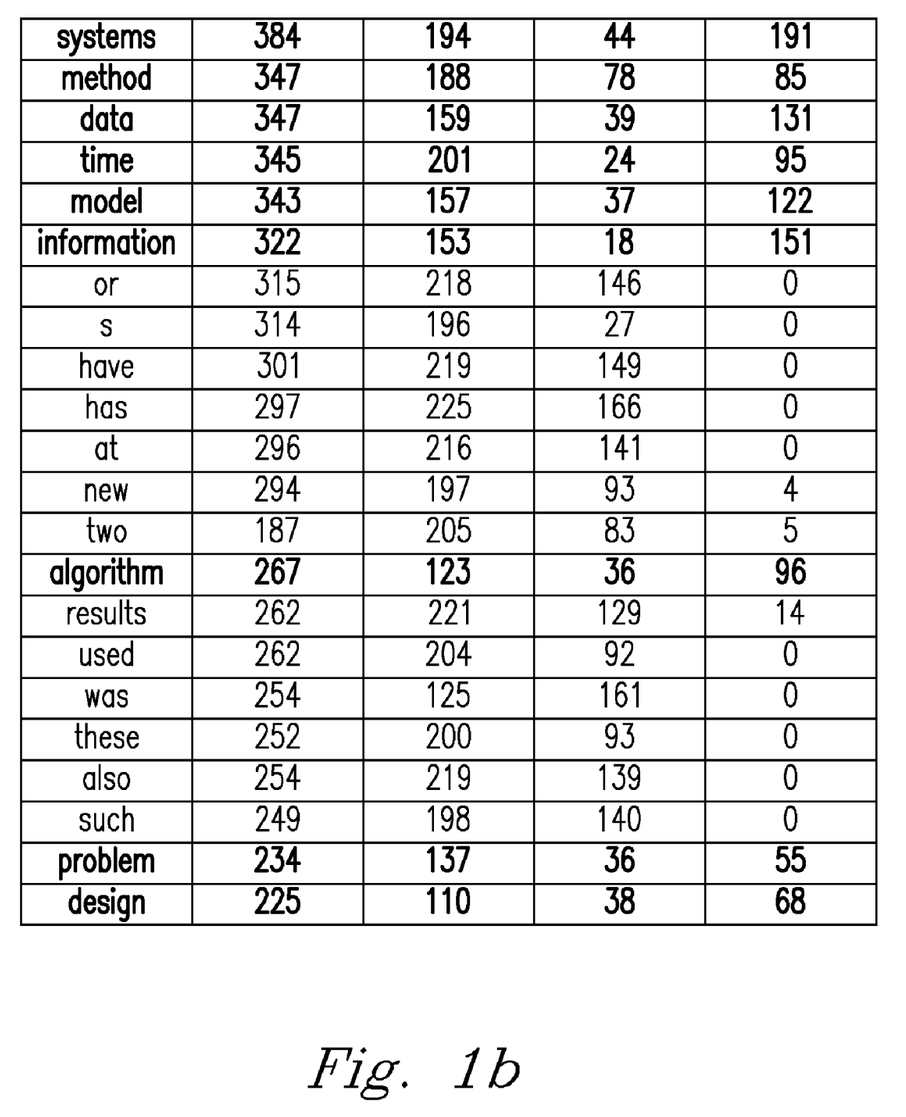

The table in FIG. 1 lists the top 50 words by term frequency in the training set of Inspec abstracts. Additional metrics shown for each word are document frequency, keyword adjacency frequency, and keyword frequency. Keyword adjacency frequency reflects the number of times the word occurred adjacent to an abstract's keywords. Keyword frequency reflects the number of times the word occurred within an abstract's keywords.

Looking at the top 50 term frequency words, in addition to the typical function words, which would typically be used as stop words, we can see system, control, and method as words that are highly frequent within technical abstracts and highly frequent within the abstracts' keywords. Selecting solely by term frequency would, therefore, cause content-bearing words to be added to the stoplist, particularly if the corpus of documents is focused on a particular domain or topic. In those circumstances selecting stop words by term frequency presents a risk of removing important content-bearing words from analysis. Instead of relying simply on term frequency, the instant embodiment considers keyword adjacency as well.

To evaluate the automatic stoplist generation of the instant example, six stoplists were generated, three of which select words for the stoplist by term frequency (TF) and that have a document frequency greater than 10, 25, or 50 documents, and three that select words by term frequency but also exclude words from the stoplist whose keyword frequency was greater than their keyword adjacency frequency (KA). Terms within the three KA stoplists are also required to have a document frequency greater than 10, 25, or 50 documents. We refer to this latter set of stoplists as keyword adjacency (KA) stoplists since they primarily include words that are adjacent to and not within keywords.

Each of the stoplists was set as the input stoplist for keyword extraction using Rapid Automatic Keyword Extraction (RAKE), which is briefly described elsewhere herein. Additional details are described in the U.S. patent application entitled, "Rapid automatic keyword extraction for information retrieval and analysis," by Stuart Rose, Nick Cramer, Vernon Crow, and Wendy Cowley (filed on Sep. 9, 2009, application Ser. No. 12/555,916), which details are incorporated herein by reference. RAKE was then run on the testing set of the Inspec corpus of technical abstracts. The input parameters for RAKE comprise one of the lists of stop words (e.g., one of the KA or TF stoplists), a set of phrase delimiters, and a set of word delimiters. RAKE then uses stop words and phrase delimiters to partition the document text into candidate keywords, which can be sequences of content words as they occur in the text. Co-occurrences of words within these candidate keywords are meaningful and allow for identification of word co-occurrence without the application of an arbitrarily sized sliding window. Word associations are thus measured in a manner that automatically adapts to the style and content of the text, enabling adaptive and fine-grained measurement of word co-occurrences that will be used to score candidate keywords.

RAKE begins keyword extraction on an individual document by parsing its text into a set of candidate keywords. First, the document text is split into an array of words by the specified word delimiters. This array is then split into sequences of contiguous words at phrase delimiters and stop word positions. Words within a sequence are assigned the same position in the text and together are considered a candidate keyword.

Figure 2:
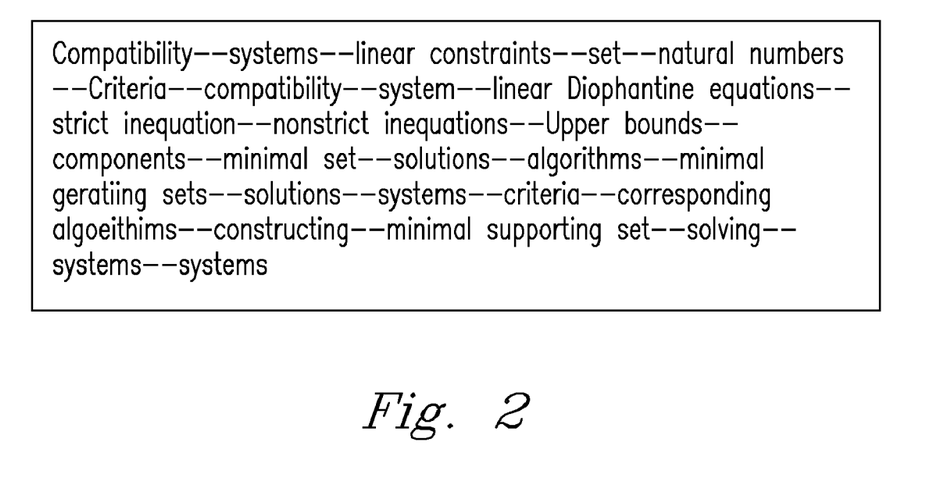
FIG. 2 is a list showing candidate keywords parsed from an abstract according to aspects of the present invention.
Figure 3:
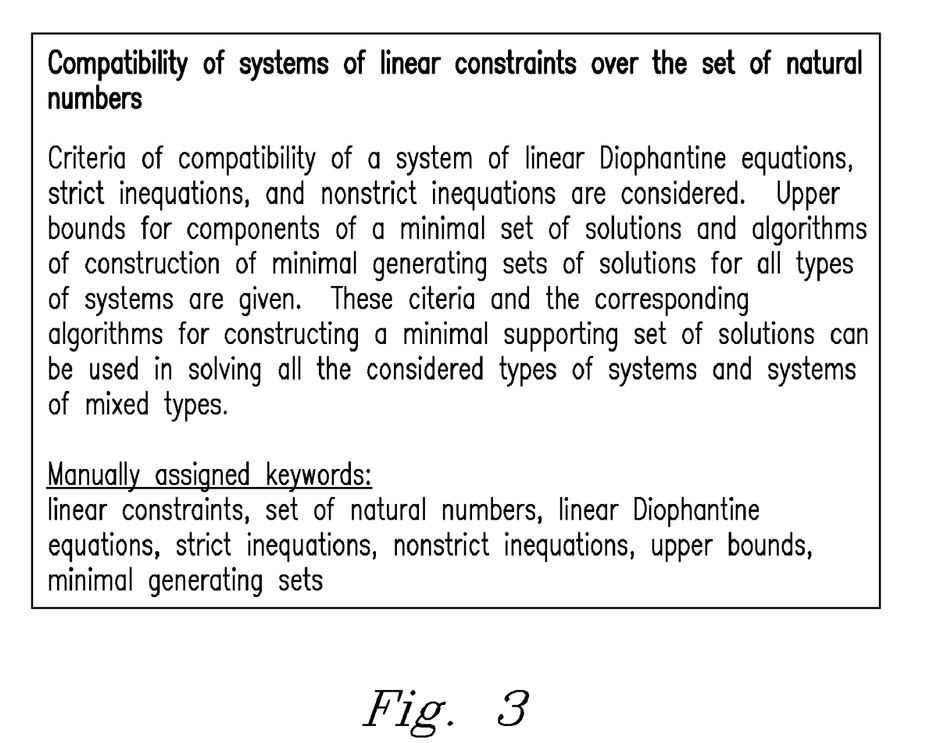
FIG. 3 is a sample technical abstract from which keywords are extracted using an automatically generated stop list, according to embodiments of the present invention.

FIG. 2 shows the candidate keywords in the order that they are parsed from a sample technical abstract shown in FIG. 3. For example, the candidate keyword linear diophantine equations begins after the stop word "of" and ends with a comma. The following word "strict" begins the next candidate keyword strict inequations.

Figure 4:
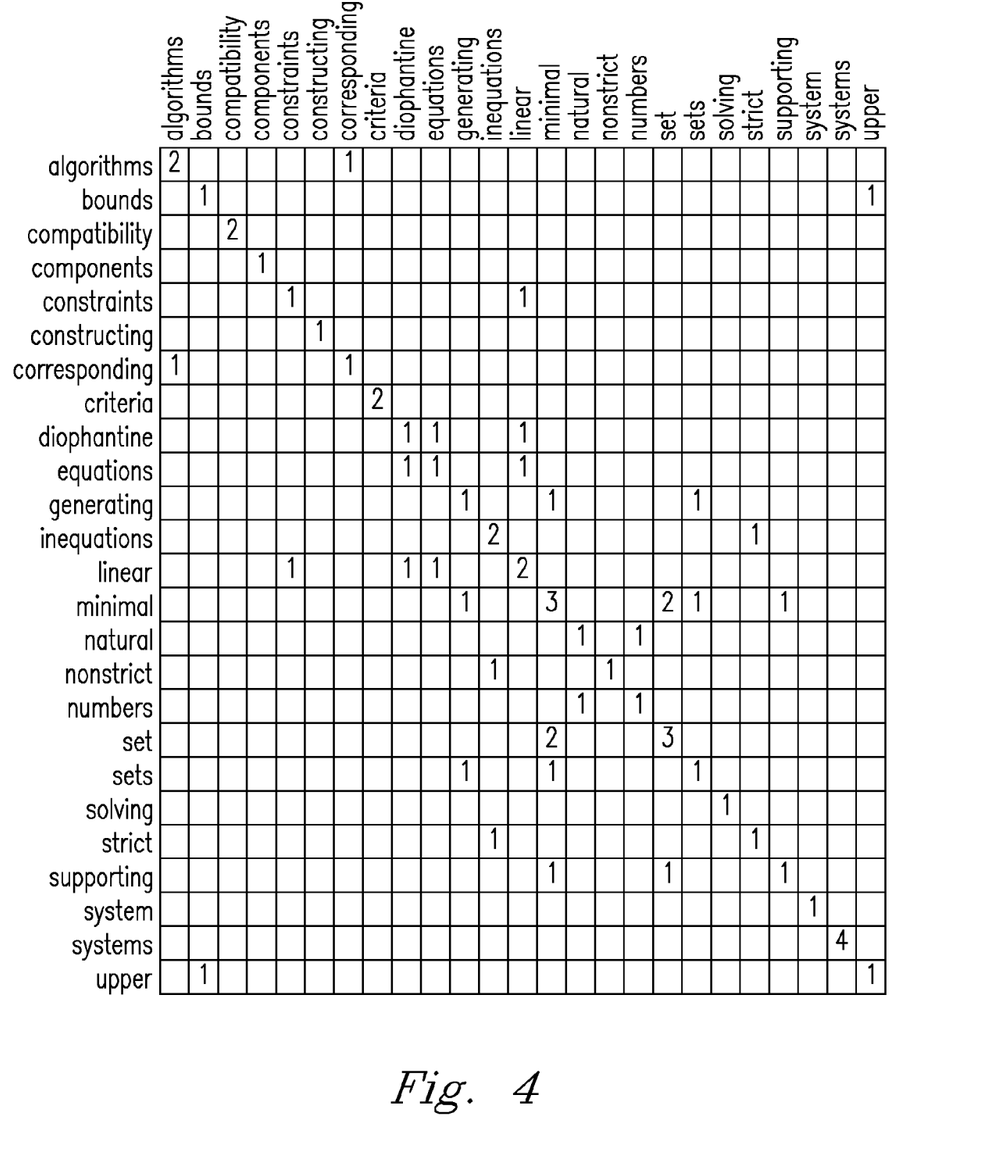
FIG. 4 is a list of candidate keywords extracted using an automatically generated stop list, according to embodiments of the present invention.

After every candidate keyword is identified and a graph of word co-occurrences (shown in FIG. 4) is complete, a keyword score is calculated for each candidate keyword and defined, in this embodiment, as the sum of its member word scores. Several metrics for calculating word scores exist based on the degree and frequency of word vertices in the graph (i.e., co-occurrence), including word frequency (freq(w)), word degree (deg(w)), and ratios of degree to frequency (deg(w)/freq(w).)

The word scores for each of the content words in the sample abstract are listed in FIG. 5. Typically, deg(w) favors words that occur often and in longer candidate keywords; deg(minimal) scores higher than deg(systems). Words that occur frequently regardless of the number of words with which they co-occur are favored by freq(w); freq(systems) scores higher than freq(minimal). Words that predominantly occur in longer candidate keywords are favored by ratios of deg(w)/freq(w). For example, deg(diophantine)/freq(diophantine) scores higher than deg(linear)/freq(linear). The keyword score for each candidate keyword is computed as the sum of its member word scores. FIG. 6 lists each candidate keyword and its keyword score from the sample abstract using the metric deg(w)/freq(w) to calculate individual word scores.

Because RAKE can split candidate keywords by stop words, extracted keywords do not contain interior stop words. In some instances identifying keywords that contain interior stopwords, such as axis of evil, can be desirable and/or beneficial. To find these keywords that contain stop words, RAKE can look for pairs of keywords that adjoin one another at least twice in the same document and in the same order. A new candidate keyword is then created as a combination of those keywords and their interior stop words. The score for the new keyword is the sum of its member keyword scores.

After candidate keywords are scored, the top T scoring candidate keywords are selected and extracted as keywords for the document. Typically, T is ⅓ the number of words in the co-occurrence graph (i.e., the number of content words). The sample abstract contains 28 content words, resulting in T=9 keywords.

Figure 7:
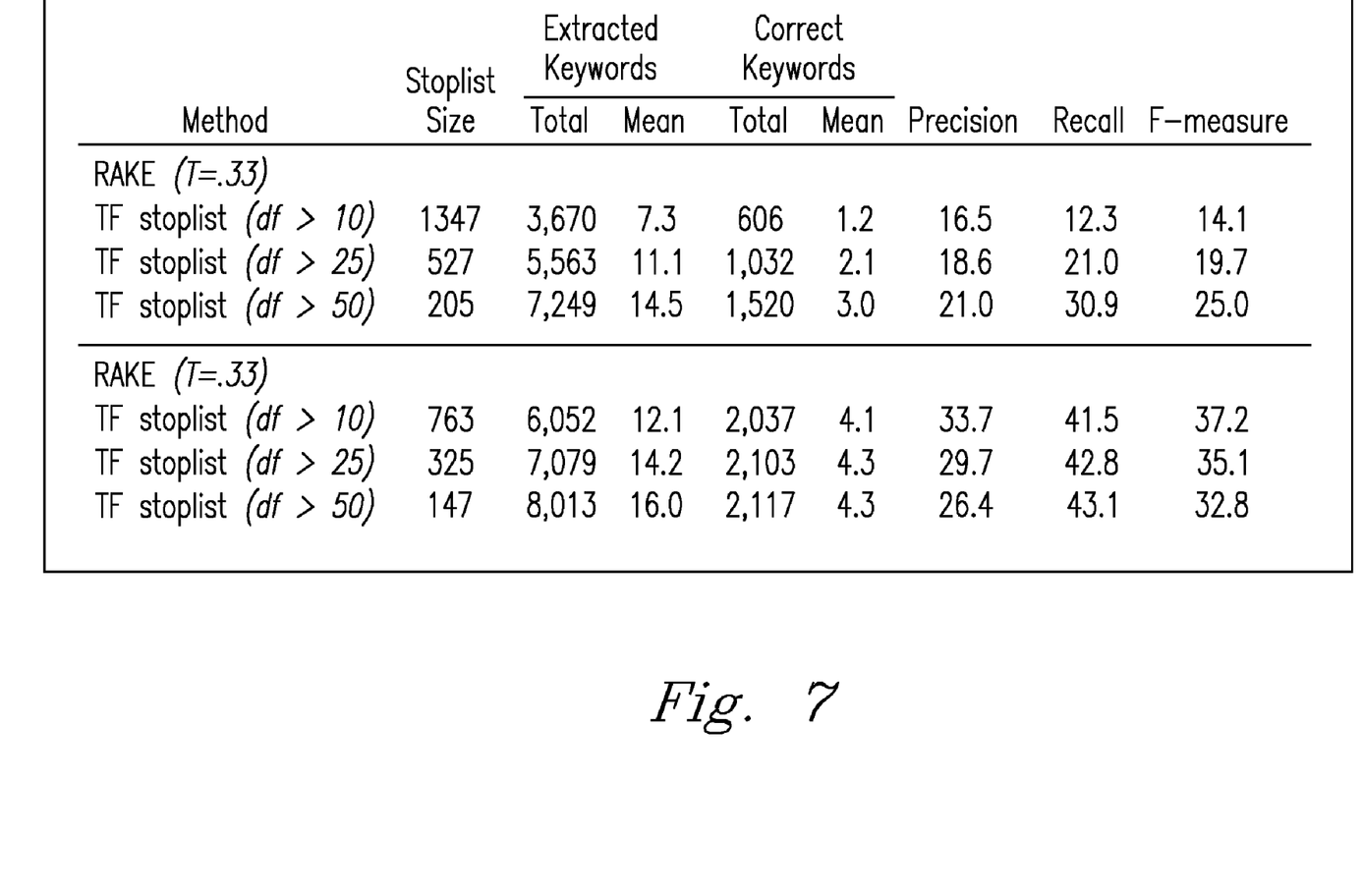
FIG. 7 is a table that lists the precision, recall, and F-measure for the keywords extracted by RAKE using stoplists generated according to embodiments of the present invention.

The table in FIG. 7 lists the precision, recall, and F-measure for the keywords extracted by RAKE from each of the keyword extraction runs using various TF or KA stoplists. The KA stoplists outperformed the TF stoplists generated by term frequency. A notable difference between results achieved using the two types of stoplists is evident from FIG. 7; the F-measure improves as more words are added to a KA stoplist, whereas when more words are added to a TF stoplist the F-measure degrades. Furthermore, the best TF stoplist underperforms the worst KA stoplist. This indicates that the automatic stoplist generation of the present invention is adding the appropriate stop words and excluding content words from the stoplist.

Because the generated KA stoplists leverage manually assigned keywords, preferred applications would be within existing digital libraries or IR systems and collections where defined keywords exist or are easily identified for a subset of the documents. Stoplists only need to be generated once for particular domains enabling keyword extraction to be applied according to the present invention to new and future articles, facilitating annotation and indexing of new documents.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

I claim:

1. A computer-implemented method of generating a stop word list for information retrieval and analysis, the method comprising:
    providing a corpus of documents and a plurality of keywords;
    constructing a term list of all terms in the corpus of documents;
    determining keyword adjacency frequency of each term in the corpus of documents, wherein the keyword adjacency frequency comprises the number of times a term occurs adjacent to one of the keywords;
    determining keyword frequency of each term in the corpus of documents,
    wherein the keyword frequency comprises the number of times a term occurs within one of the keywords;
    excluding from the term list each term having a ratio of keyword adjacency frequency to keyword frequency that is less than a predetermined value; and
    truncating the term list based on a predetermined criteria to form the stop word list.

2. The computer-implemented method of claim 1, wherein keywords are provided for each document in the corpus of documents.

3. The computer-implemented method of claim 1, wherein the predetermined value of the ratio of the keyword adjacency frequency to keyword frequency is 1.

4. The computer-implemented method of claim 1, wherein the predetermined criteria comprise a document frequency value that is less than a threshold value.

5. The computer-implemented method of claim 1, wherein the predetermined criteria comprise a predetermined fixed length for the stop word list.

6. The computer-implemented method of claim 1, further comprising applying the stop word list to parse a second corpus of documents.

7. A system for generating a stop word list for information retrieval and analysis, the system comprising;
    a storage device, a communications interface, or both providing a corpus of documents and a plurality of keywords; and
    a processor programmed to:
        construct a term list of all terms in the corpus of documents;
        determine keyword adjacency frequency of each term in the corpus of documents, wherein the keyword adjacency frequency comprises the number of times a term occurs adjacent to one of the keywords;
        determine keyword frequency of each term in the corpus of documents, wherein the keyword frequency comprises the number of times a term occurs within one of the keywords;
        exclude terms from the term list if the ratio of keyword adjacency frequency to keyword frequency is less than a predetermined value; and
        truncate the term list based on predetermined criteria to form the stop word list.

8. The system of claim 7, wherein keywords are provided for each document in the corpus of documents.

9. The system of claim 7, wherein the predetermined value of the ratio of the keyword adjacency frequency to keyword frequency is 1.

10. The system of claim 7, wherein the predetermined criteria comprises a document frequency value that is less than a threshold value.

11. The system of claim 7, wherein the predetermined criteria comprises a predetermined fixed length for the stop word list.

12. The system of claim 7, wherein the processor is further configured to apply the stop word list to parse a second corpus of documents.

* * * * *